J. F. O'CONNOR.
RAILWAY DRAFT RIGGING.
APPLICATION FILED SEPT. 14, 1911.
1,070,056.
Patented Aug. 12, 1913.
2 SHEETS—SHEET 1.
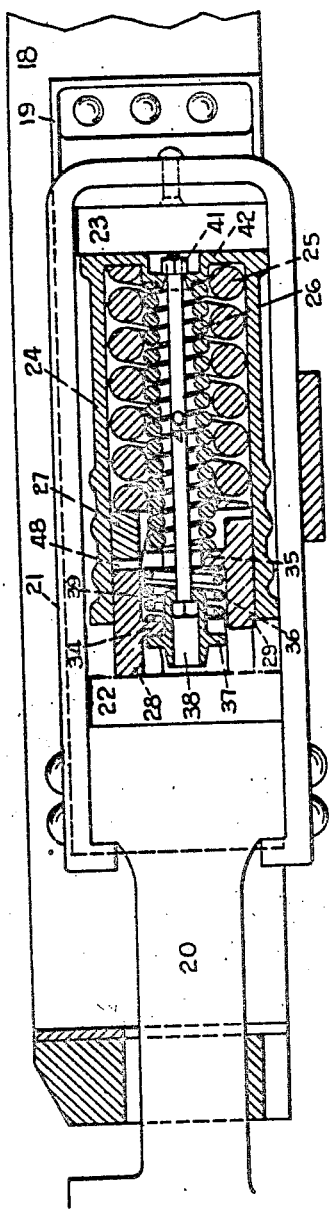
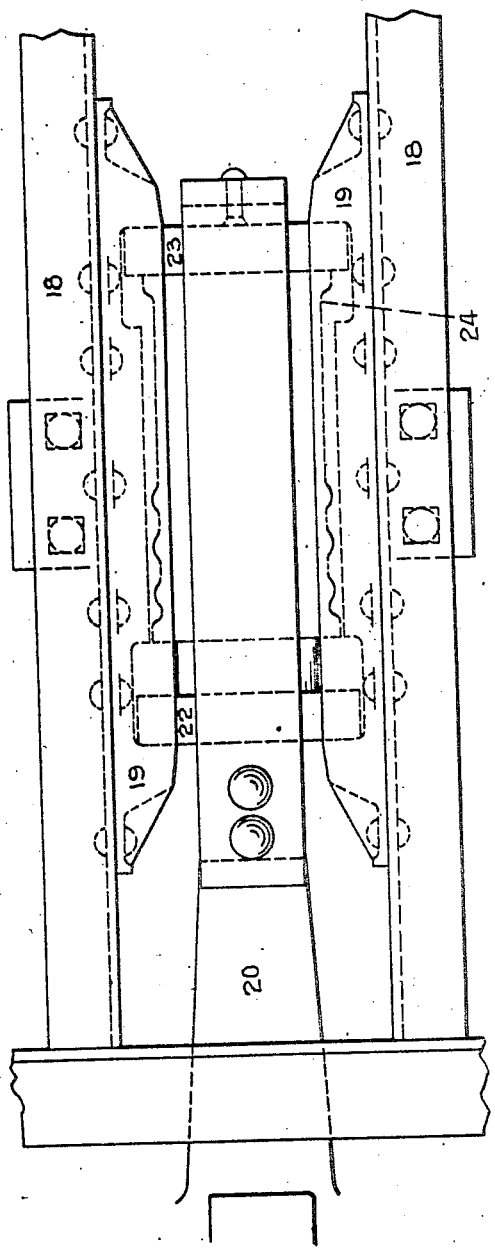
WITNESSES
Calvin B. Patch
Helen Williams
INVENTOR
John F. O'Connor.

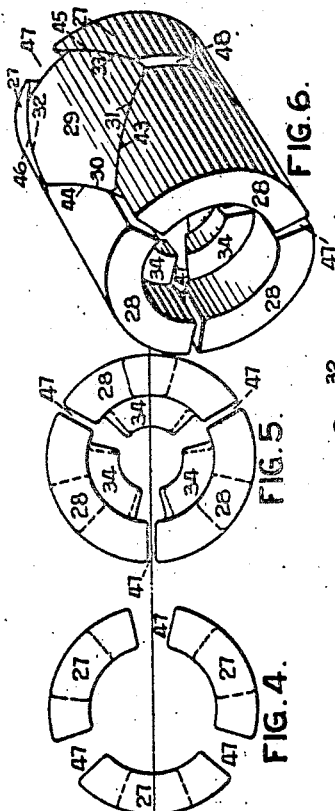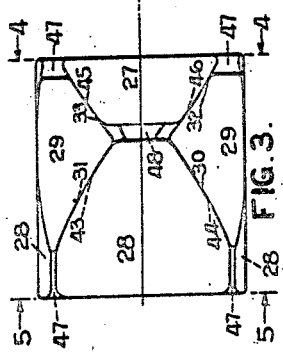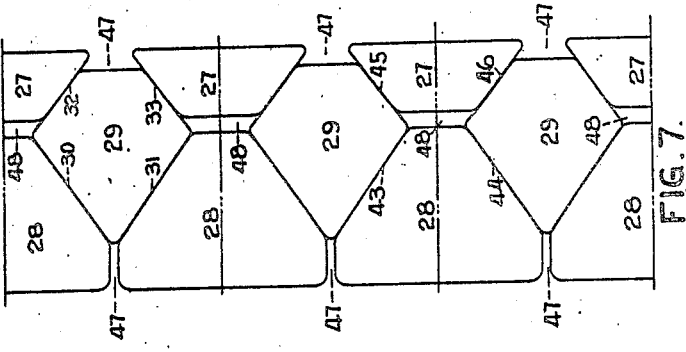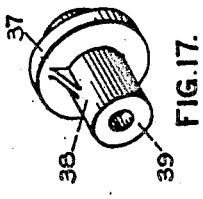

111
UNITED STATES PATENT OFFICE.

JOHN F. O'CONNOR, OF CHICAGO, ILLINOIS, ASSIGNOR TO W. H. MINER, OF CHICAGO, ILLINOIS.

RAILWAY DRAFT-RIGGING.

1,070,056.  Specification of Letters Patent.  Patented Aug. 12, 1913.

Application filed September 14, 1911. Serial No. 649,374.

*To all whom it may concern:*

Be it known that I, JOHN F. O'CONNOR, a citizen of the United States, residing at Chicago, in the county of Cook and State of Illinois, have invented a certain new and useful Improvement in Railway Draft-Rigging, of which the following is a full, clear, concise, and exact description, reference being had to the accompanying drawings, forming a part of this specification.

My invention relates to an improvement in friction draft rigging for railway cars.

The object of my invention is to provide a friction draft rigging of a simple, efficient and strong construction, composed of few parts and capable of being cheaply manufactured, and more particularly in which the friction shoes may be made of relatively cheap material such as ordinary iron castings, and at the same time be free from danger of fracture or injury under unusually heavy shocks and blows.

My invention consists in the means employed and herein shown and described to practically accomplish this object, the same being more particularly pointed out in the claims.

In the accompanying drawings which form a part of this specification, Figure 1 is a side elevation, partly in central, vertical, longitudinal section, of a friction draft rigging embodying my invention. Fig. 2 is a plan view. Fig. 3 is a vertical longitudinal view of the group of friction shoes but without the other parts. Fig. 4 is an end view at the line 4—4 of Fig. 3. Fig. 5 is an end view on the line 5—5 of Fig. 3. Fig. 6 is a perspective view of the group of friction shoes assembled together but without the other parts. Fig. 7 is an unfolded view of the outer faces of the friction shoes. Fig. 8 is an end view of one of the intermediate friction shoes. Fig. 9 is an elevation of one of the intermediate friction shoes. Fig. 10 is a perspective view of one of the intermediate friction shoes. Fig. 11 is a plan view of one of the rear friction shoes. Fig. 12 is an elevation of one of the rear friction shoes. Fig. 13 is a perspective view of one of the rear friction shoes. Fig. 14 is an elevation of one of the front friction shoes. Fig. 15 is a plan view of one of the front friction shoes. Fig. 16 is a perspective view of one of the front friction shoes. Fig. 17 is a perspective of the connecting thimble.

In the accompanying drawings 18 represents the center or draft sills of the car frame to which the stop members or castings, 19, are attached; 20 the draw-bar; 21, the draft yoke; 22, the front follower; 23, the rear follower; 24, a longitudinal movable friction shell arranged between the followers; 25, 26, springs longitudinally arranged within the friction shell; 27, the rear annular segmental wedging friction shoes; 28, the front annular segmental wedging friction shoes, oppositely arranged with the rear set, 27. Intermediate between the two sets of friction shoes, 27 and 28, is a third set of friction shoes, 29, the rear set of shoes, 27, preferably comprising three segmental wedging shoes, each preferably of comparatively less length and with shorter lateral surfaces than those of the forward set, 28, and each of the shoes of the rear set preferably made identical in shape and from the same pattern, the forward set of shoes, 28, preferably three in number and preferably of greater length and with longer bearing surfaces than the rear set, and each of the shoes of the forward set preferably made identical in shape and from the same pattern. The shoes of the intermediate set of friction shoes, 29, each consists of an annular segmental friction shoe, and the shoes of this set are preferably three in number and preferably identical in shape and made from the same pattern and each having the double wedging, or four inclined surfaces, 30, 31, 32 and 33, the front surfaces, 80 and 31 preferably being considerably longer than the rear surfaces, 32 and 33. Each of the front shoes, 28, is provided with an annular, internal segmental rib, 34, and each of the intermediate shoes, 29, is provided with an annular internal segmental rib, 35. The said ribs of the front and intermediate sets of friction shoes afford bearing for the short auxiliary spring, 36, interposed between the front set of shoes, 28, and the intermediate set of shoes, 29. The segmental ribs, 34, of the front set of shoes also afford bearing for the flange, 37, of the connecting thimble, 38. The segmental internal ribs, 35, of the intermediate set of shoes, 29, afford seat or bearing for the front end of the small spring, 26, to react against the said small spring, 26, being nested within the large spring, 25, which reacts at its front end against the rear set of said segmental wedging friction shoes, 27. The connecting thimble or bearing, 38, is hollow and furnished with an internal flange, 39, for the head of the connecting rod to bear against. The connecting rod, 40, is furnished with a threaded end and nut 41, at its rear end for engagement with the member, 42, which closes the rear end of the friction shell, 24, and which, if preferred, may be cast integral with the friction shell. The spring, 25, thus reacts at its rear end against the friction shell and at its front end against the rear set of friction shoes, 27.

Each of the front and rear annular segmental friction shoes has two inclined or wedging faces, 43—44, 45—46, and a clearance space, 47, is left between each of the friction shoes of each of the front and rear sets at the larger or base end of the shoes to avoid interference and allow for variations in details met with in foundry work. These three sets of annular segmental wedging friction shoes, 27, 28 and 29, are assembled together as indicated in Fig. 6, so that the wedging faces of the front set of shoes will bear against the front wedging faces of said intermediate set, and with a slight space 48, between the said wedging faces of the shoes when the same are in normal position and not under compression. The short wedging faces of the rear set of shoes engage and bear against the rear wedging faces of the intermediate set of shoes.

The front follower, 22, bears against the front ends of the front set of friction shoes and the rear follower, 23, against the rear end of the friction shell. As the annular segmental friction shoes of the front set internest circumferentially with the annular segmental friction shoes of the intermediate set and as the wedge faces of the intermediate set act against the wedge faces of the rear set, the shoes are each and all subjected only to crushing strains and are consequently adapted to be made of relatively cheaper and more fragile material, such as ordinary white iron castings. On compression the first pressure upon the forward end of the front set of shoes transmitted through the front follower, 22, is initially transmitted from the front set of shoes to the intermediate set of shoes through the auxiliary spring, 36. The rear set of shoes are in wedging contact with the wedging faces of the intermediate shoes and have a wedging action in the cylinder at all times and retard the transmission of the movement to the springs, 25 and 26, until space 48 has been closed and front shoes engage the intermediate shoes at wedging faces. The front set of friction shoes, each with the preferably long wedging faces, 43 and 44, come into contact with the front wedging faces of the intermediate set of shoes, 29. The shock absorbing action of the triple set of expansible annular wedging shoes is highly efficient.

By the use of the preferably comparatively short rear shoe with blunt angled faces, coupled with the action of the auxiliary spring between the intermediate and front sets of shoes, there is insured a perfect release of the parts of the shock absorbing device after compression. The connecting thimble, 38, and the connecting rod, 40, serve to hold all the parts in assembled position and also to provide means for maintaining the springs under initial compression and for automatically taking up any wear of the friction shell and shoes. Each of the wedge faces of each of the friction shoes of all three sets is preferably a spirally twisted wedge face instead of a straight or true plane, that is to say, each face is radial of the friction shell at all points of the length of the wedge face, causing true and perfect contact between the wedge faces of the adjacent shoes of all three sets throughout the length of the wedge faces.

I claim:

1. In a friction draft rigging, a longitudinally movable friction shell, springs within the shell, one nested within the other, front and rear and intermediate sets of annular segmental wedging friction shoes, the shoes of the front set and intermediate set being each furnished with internal shoulders, a spring interposed between the internal shoulders of the front and intermediate sets of shoes, and a connecting thimble bearing against the shoulders of the front set of shoes and a rod connecting said thimble and friction shell, substantially as specified.

2. In a friction draft rigging, in combination, a longitudinally movable friction shell, a spring, two sets of oppositely arranged annular, segmental wedging friction shoes, an intermediate set of double faced wedging friction shoes, said spring reacting at one end against the friction shell and at the other end against one set of friction shoes, and a further spring nested within said first spring and reacting at one end against the friction shell and at the other end against one set of friction shoes, and an auxiliary spring reacting at one end against the front set of friction shoes and at the other end against the intermediate set of friction shoes, substantially as specified.

3. In a friction draft rigging, in combination, a longitudinally movable friction shell, a spring, two sets of oppositely arranged annular, segmental wedging friction shoes, an intermediate set of double wedging friction shoes, said spring reacting at one end against the friction shell and at the other end against one set of friction shoes, and a further spring nested within said first spring and reacting at one end against the friction shell and at the other end against one set of friction shoes, and an auxiliary spring reacting at one end against the intermediate set of friction shoes and against the front set of friction shoes at the other end, the shoes of the front and intermediate sets having internal ribs to afford bearings for said auxiliary spring, substantially as specified.

4. In a friction draft rigging, in combination, a longitudinally movable friction shell, a spring, two sets of oppositely arranged annular segmental wedging friction shoes and an intermediate double faced set of annular segmental friction shoes, the wedging surfaces of the shoes of the front set and the front wedging surfaces of the shoes of the intermediate set being longer than the wedging surfaces of the shoes of the rear set and the rear wedging surfaces of the shoes of the intermediate set, and an auxiliary spring reacting at one end against the front set of friction shoes and at the other end against the intermediate set of friction shoes.

5. In a friction draft rigging, in combination, a longitudinally movable friction shell, a spring and two sets of oppositely arranged annular segmental wedging friction shoes and an intermediate double faced set of annular segmental wedging friction shoes, the shoes of the front set being provided with friction bearing surfaces of large area and the friction shoes of the rear set being provided with friction surfaces of smaller area and the intermediate double faced shoes being provided with friction bearing surfaces of areas less than front shoes and greater than on the rear shoes, and an auxiliary spring acting at one end against the intermediate set of friction shoes and at the other end against the front set of friction shoes, substantially as specified.

6. In a railway draft rigging, a friction shell, and within said shell two sets of oppositely arranged annular segmental wedging friction shoes and an intermediate set of double faced wedging friction shoes, a spring mechanism re-acting at one end against the friction shell and at the other end against one set of friction shoes, and an auxiliary spring re-acting at one end against the front set of friction shoes, and at the other end against the intermediate set of friction shoes.

JOHN F. O'CONNOR.

Witnesses:
George A. Johnson,
Eleanor L. Nash

Copies of this patent may be obtained for five cents each, by addressing the "Commissioner of Patents, Washington, D. C."